United States Patent
Burch et al.

(10) Patent No.: US 7,415,386 B2
(45) Date of Patent: Aug. 19, 2008

(54) METHOD AND SYSTEM FOR FAILURE SIGNAL DETECTION ANALYSIS

(75) Inventors: Richard Burch, McKinney, TX (US); Paul Lin, Shanghai (CN); Spencer Graves, San Jose, CA (US); Eric Antonissen, Redwood City, CA (US)

(73) Assignee: PDF Solutions, Inc., San Jose, CA (US)

( * ) Notice: Subject to any disclaimer, the term of this patent is extended or adjusted under 35 U.S.C. 154(b) by 0 days.

(21) Appl. No.: 10/596,960

(22) PCT Filed: Dec. 31, 2003

(86) PCT No.: PCT/US03/41668

§ 371 (c)(1),
(2), (4) Date: Jul. 16, 2007

(87) PCT Pub. No.: WO2005/069191

PCT Pub. Date: Jul. 28, 2005

(65) Prior Publication Data

US 2007/0288185 A1    Dec. 13, 2007

(51) Int. Cl.
G06F 19/00    (2006.01)
(52) U.S. Cl. .......................... 702/183; 438/17
(58) Field of Classification Search ............. 702/183, 702/182, 184–185, 188; 438/5, 17, 18, 10, 438/11
See application file for complete search history.

(56) References Cited

U.S. PATENT DOCUMENTS

| | | | |
|---|---|---|---|
| 5,539,752 A | 7/1996 | Berezin et al. |
| 5,633,173 A | 5/1997 | Bae |
| 5,777,901 A | 7/1998 | Berezin et al. |
| 5,831,865 A | 11/1998 | Berezin et al. |
| 5,991,699 A | 11/1999 | Kulkarni et al. |
| 6,049,895 A | 4/2000 | Sugimoto |
| 6,238,940 B1 | 5/2001 | Steffan et al. |
| 6,292,260 B1 | 9/2001 | Lin et al. |
| 6,513,151 B1 | 1/2003 | Erhardt et al. |

*Primary Examiner*—Edward Raymond
(74) *Attorney, Agent, or Firm*—Duane Morris LLP; Steven E. Koffs

(57) ABSTRACT

A method for analyzing a sample of wafers includes identifying F failure metrics applicable to at least one pattern on each wafer within the sample. Z spatial and/or reticle zones are identified on each wafer, where Z and F are integers. Values are provided for each failure metric, for each zone on each wafer. A point is defined for each respective wafer in an N-dimensional space, where N=F*Z, and each point has coordinates corresponding to values of the F failure metrics in each of the zones of the corresponding wafer. The sample of wafers is partitioned into a plurality of clusters, so that the wafers within each clusters are close to each other in the N-dimensional space. A plurality of clusters is thus identified from the sample of wafers so that within each individual cluster, the wafers have similar defects to each other.

16 Claims, 14 Drawing Sheets

METHOD AND SYSTEM FOR FAILURE SIGNAL DETECTION ANALYSIS

FIELD OF THE INVENTION

The present invention relates to semiconductor fabrication generally, and more specifically to methods for analyzing semiconductor yield data.

BACKGROUND

The fundamental task of yield analysis is to determine the root cause of yield loss so that the consultant, factory engineer and/or designer can take action to mitigate the yield loss mechanism(s). The fundamental challenge is to connect the yield loss, as manifested in failure bit map (FBM) failures or die sort fail bins, as presented by e-test data, to its root cause. Typically, the source of the bin failures from the test data is unknown, but without this information a course of action cannot be taken to resolve the issue. Standard techniques for finding yield loss mechanisms include correlation analysis of yield vs. inline data, e-test data, defect, or wafer process history data. However, straightforward correlation analysis is hampered by the fact that in the manufacture of IC's, hundreds of process steps involving many pieces of associated equipment are employed, anyone of which may contribute to yield loss. Because of the superposition of yield impacting signals, correlation analysis signals may be weak or obscured because multiple failure modes may be present in a given population of wafers.

Generally, yield loss in semiconductor processing may be characterized as being composed of two components; systematic yield loss and random yield loss. This systematic yield loss may occur due to poor processing conditions or centering at a given process step, or perhaps the yield loss may be associated with a design marginality or flaw. Random yield loss tends to be associated with normal operating conditions where the background levels of defectivity from the fab ambient environment and/or ambient within tools contribute to defects on the wafer. Partitioning methods attempt to discern the random yield loss from the systematic yield loss so that subsequent investigation into root cause(s) can address each issue as deemed necessary. One such method uses a wafer tiling algorithm whereby die are aggregated into groups of die of varying size such that the slope of the logarithm of group yields vs. group size is an estimate of the random defectivity (Do) assuming Poisson statistics, and the y-intercept is an estimate of the systematic yield (Ys) (Segal et al., 2000). In this latter approach, one is able to get an estimate of Ys for a given wafer(s), but it is not readily possible to group wafers with similar Ys values as belonging to the same root cause group or cluster of wafers because no spatial distribution information is maintained. In other words, different root causes may have similar Ys values. Other methods do not rely on the test data but utilize test chips that contain representative attributes that can define the systematic yield values as they are related to an IC product.

A first method of identifying yield loss and drill down analysis (identifying the fundamental root cause of failure) is disclosed in U.S. Pat. No. 6,393,602 by Atchison et al., which discloses a yield management method by which clustering is done in a similar manner as prescribed by Segal et al., "Reducing baseline defect density through modeling random defect limited yield", MicroMagazine, January 2000. They employ a negative binomial statistic to estimate the systematic and defect limited yield. In this case, a clustering factor is estimated but this clustering factor is an aggregate across the wafer or wafers. In other words, assuming a fairly symmetric wafer, this method would not discriminate between N chips failing in the upper left corner versus N chips failing in the lower right corner, but the physical mechanisms for these yield losses are likely very different. Further, Atchison et al. go on to disclose the use of spatial analysis but only in a straightforward and rudimentary manner whereby wafer region yields are simply plotted in 2-D projections for visual review.

U.S. Pat. No. 6,470,229 by Wang et al, discloses a comprehensive yield management system and method using data pre-processing to remove bad data and data mining techniques to generate a decision tree for an automated analysis system. The data mining system is used to build a decision tree to find relationships between the response variable and the predictor variable(s) to find the best decision-split based on each predictor. In this way, the response variable, typically yield, may be related to one or more predictor variables. These types of generalized data mining techniques, while in principle are very elegant and attractive, in practice fall short of expectations due to large amounts of noise in the system.

In the semiconductor manufacturing process the process wafers are subject to random and non-random spatial defect sources/root causes. Some clustering algorithms attempt to discern between the random and non-random defect components by assigning the non-random defect pattern(s) to a given cluster. Clustering has been applied to optical defect inspection data to determine if a given defect is actually part of a group of other defects, e.g., associated with a scratch. Other clustering algorithms may not specifically attempt to discern between random and non-random responses but rather simply group wafers with similar patterns inclusive of random and non-random responses. This latter approach is more generally used when looking at patterns of bin data. Differentiating between different clusters is an additional burden that an algorithm must properly perform to be useful so as to distinguish different patterns and hence root causes.

To accomplish this separation, a clustering metric is applied and a clustering criteria and/or threshold are set. Some metric of difference criteria is set to provide a threshold of association. Hansen and James (Bell Labs Technical Journal, 1997) discuss an approach where they applied smoothing to spatial pass/fail bin die sort data based on a user selected smoothing threshold. They then test the resulting wafer map for spatial randomness based on joint count statistics. If the wafer map fails the spatial randomness test it is compared with other wafers that have failed the same test using a hierarchical clustering method using the "thresholded maps". The association of wafers in clusters suggests that the wafers in the group may likely have similar root causes for their die failures. In this way, clustering of wafers may aid in the diagnosis of yield limiting issues in the fabrication process. The "thresholded maps" constitute a library of known wafer patterns that are correlated against process wafers coming from the production line. In this way, wafers can be classified as belonging to a certain group of previously defined patterns. The problem with this approach is that it is only strictly valid for a given process and product layout which is relatively mature because the catalog or library of patterns is not necessarily static, especially as technology nodes change and as new process steps and materials are introduced (See "International Technology Roadmap for Semiconductors," 2001 Edition. Semiconductor Industry Association, 2001.) Also, this technique has been applied to the overall fail bin vs. pass bin case but does not seem readily amenable to exploring the generalized bin failure case as is the case for the invention disclosed herein. Other software applications (e.g. S-Wafers)

essentially divide all wafers up and the engineer has to visually group the wafers with similar patterns together.

SUMMARY OF THE INVENTION

A method for analyzing a sample of wafers comprises: identifying F failure metrics that are applicable to at least one circuit pattern on each wafer within the sample of wafers, where F is an integer; identifying Z spatial and/or reticle zones on each wafer, where Z is an integer; providing values for each of the F failure metrics, for each of the Z zones on each wafer; defining a point for each respective wafer in an N-dimensional space, where N=F*Z, and each point has coordinates corresponding to values of the F failure metrics in each of the Z zones of the corresponding wafer; and clustering the sample of wafers into a plurality of clusters of wafers, so that the wafers within each cluster are close to each other in the N-dimensional space, thereby identifying the plurality of clusters of wafers from the sample of wafers so that within each individual cluster, the wafers have similar defects to each other.

Each of these acronyms correspond or represent a failure mode of the chip memory block(s). For example, PWRS means power-short and BIT means single bit cell failure. The specific failure modes shown in the figure are not important; wafers may be grouped by any failure modes that are pertinent for a given wafer population and process.

Figure 9:
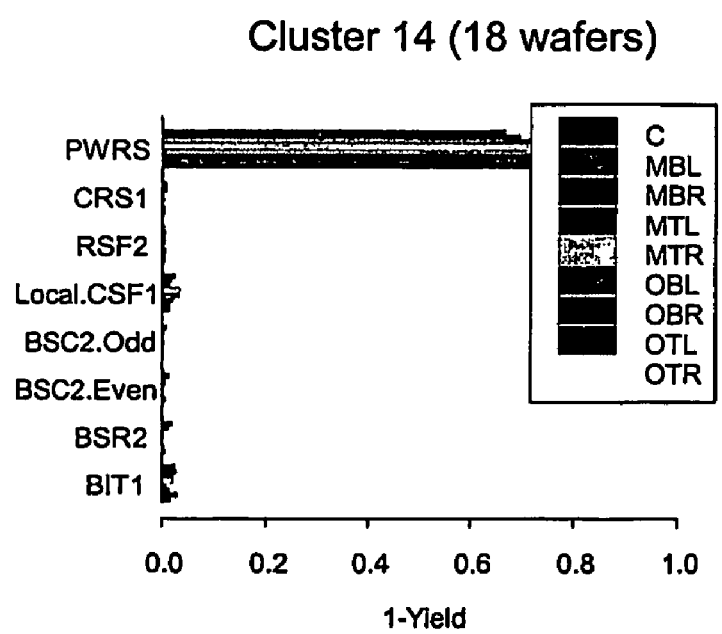

FIG. 9 is an exemplary pareto plot of another cluster having 18 wafers, in which one of the yield metrics (designated PWRS) has significantly more failures than any of the other yield metrics.

Figure 10:
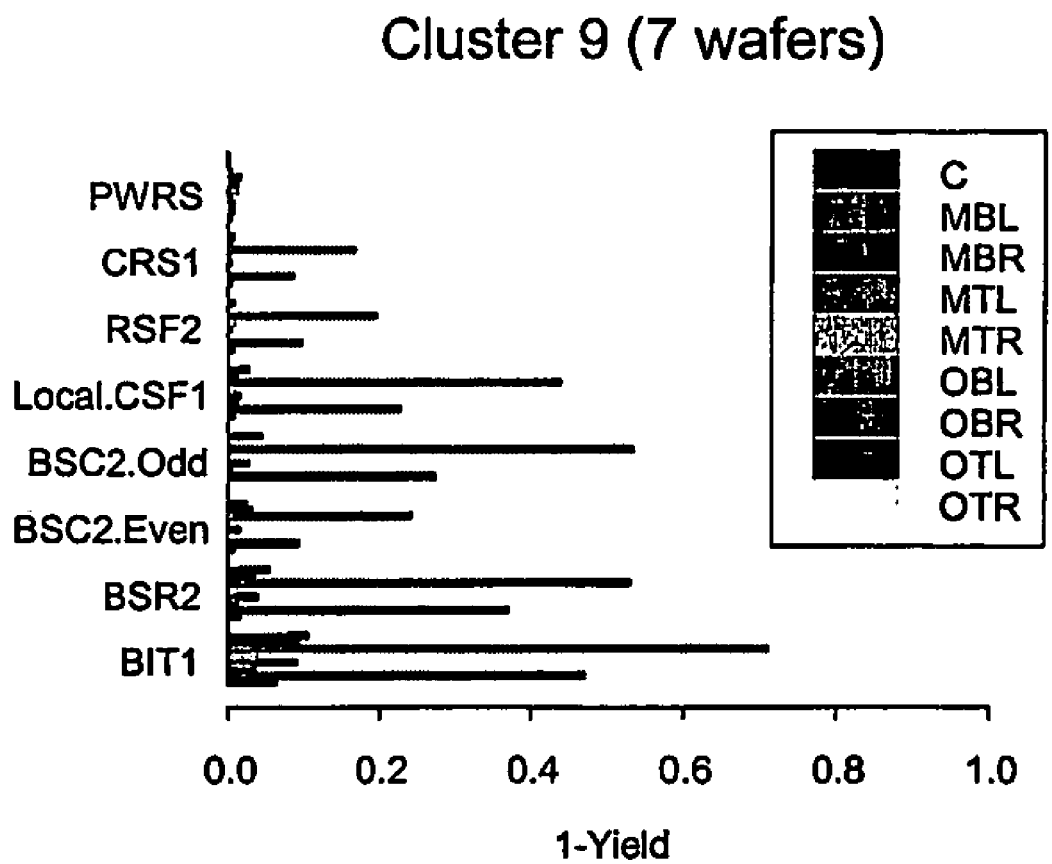

FIG. 10 is an exemplary pareto plot of another cluster having 7 wafers, in which 7 out of 8 yield metrics have significantly more failures in one spatial zone (OBL) than in the other 8 spatial zones.

Figure 11:
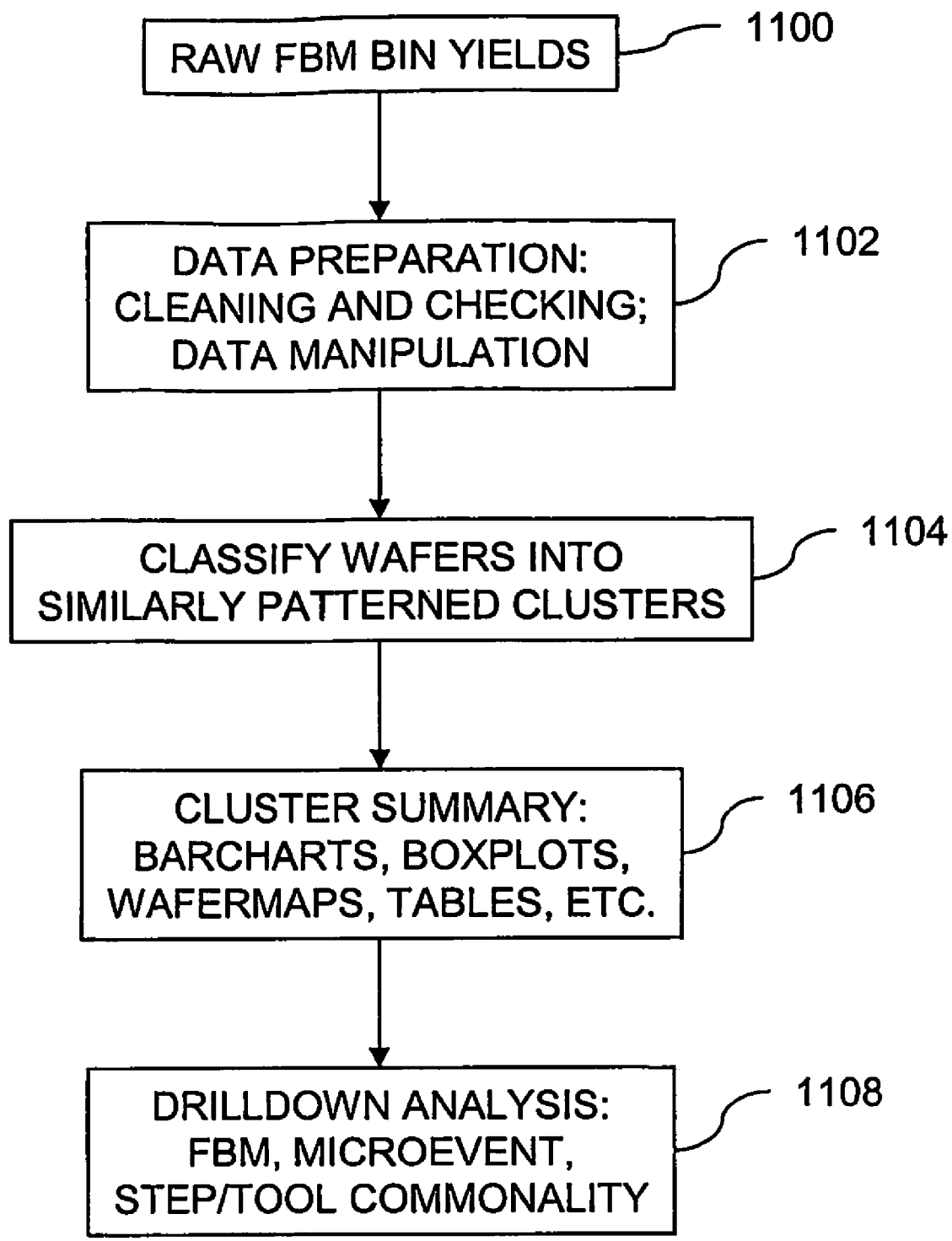

FIG. 11 is a flow chart of an FBM-Bin Yields Cluster Analysis. This figure depicts the basic algorithm flow of FSDA for FBM data FIGS. 12A and 12B. Standardization of FBM-Clustering Drill Down Algorithm: These figures depict the more generalized analysis flow including drilldown analysis.

Figure 13:
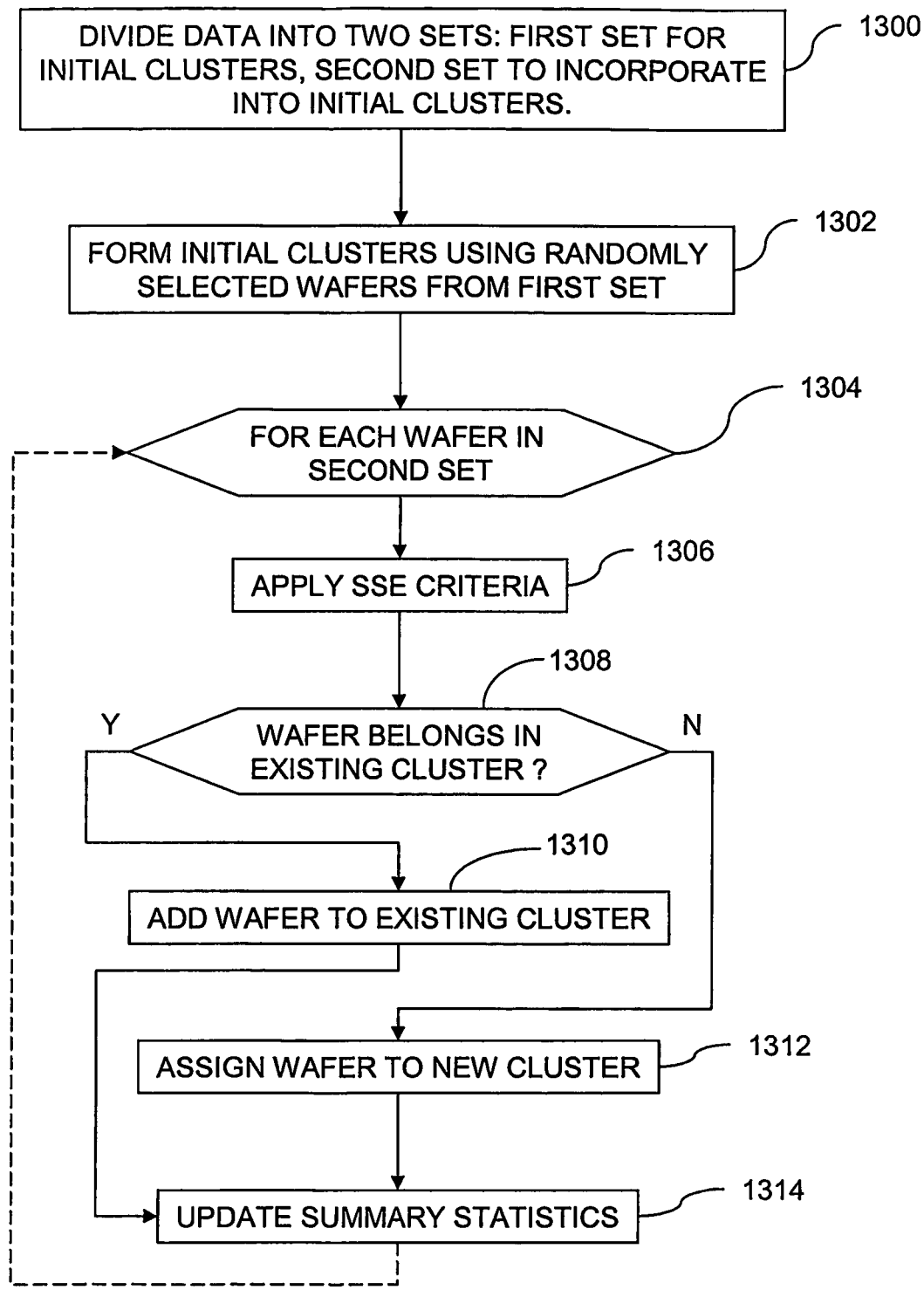

FIG. 13 is a flow chart diagram showing a variation of the clustering method that may be used for wafer samples having very large numbers of wafers.

Figure 12A:
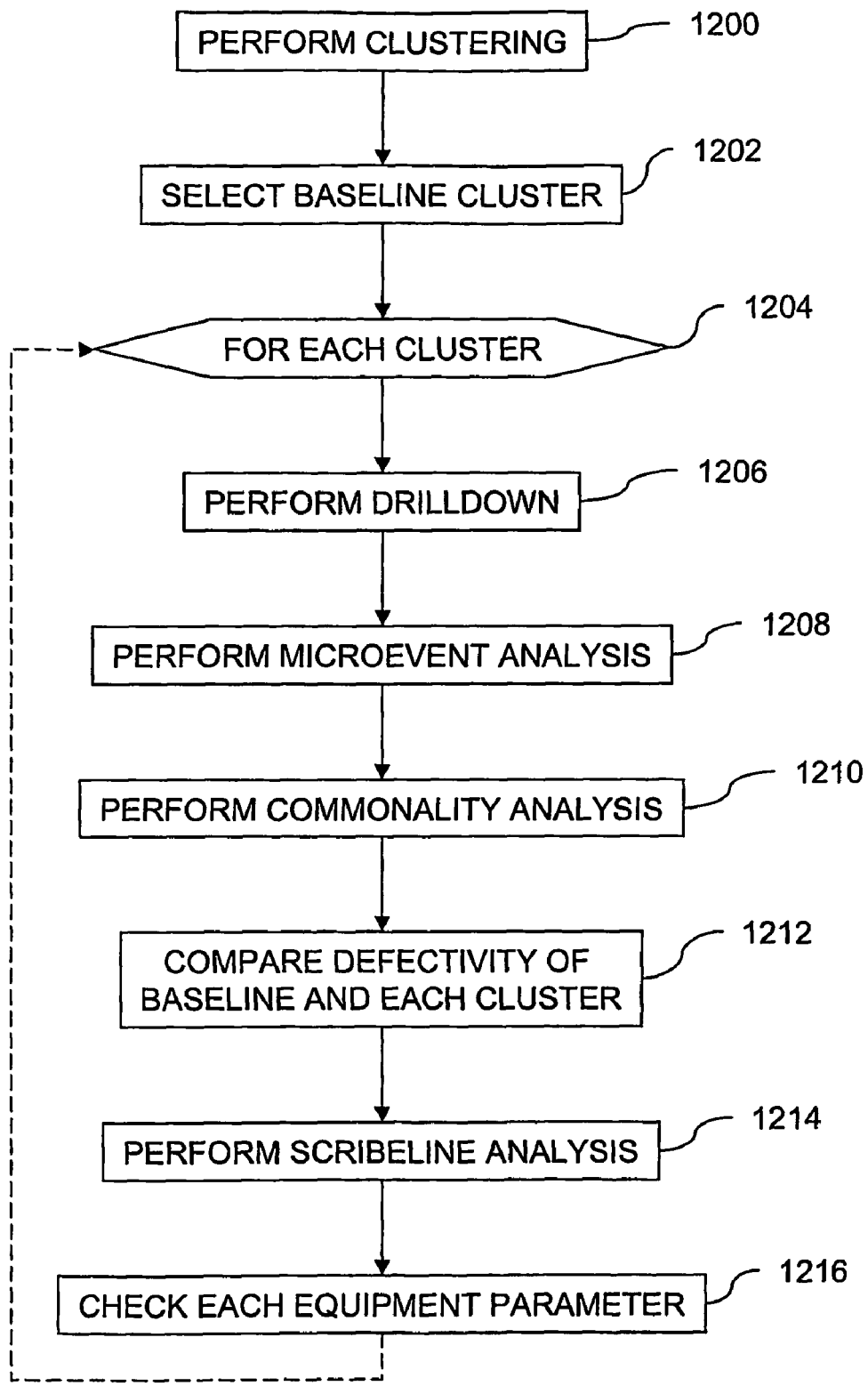
Figure 14:
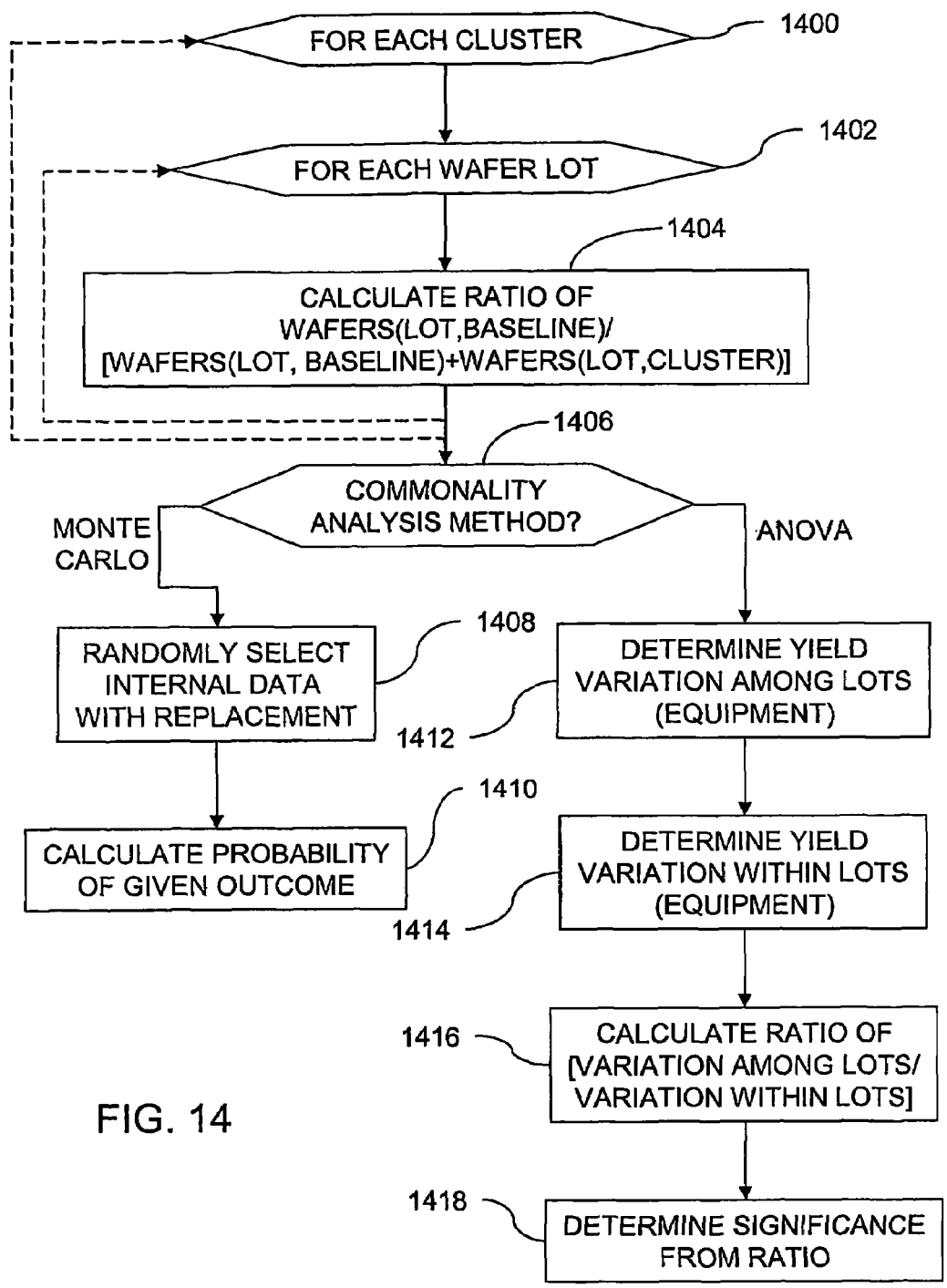

FIG. 14 is a detailed flow chart diagram showing the commonality analysis of FIG. 12A.

DETAILED DESCRIPTION

This description of the exemplary embodiments is intended to be read in connection with the accompanying drawings, which are to be considered part of the entire written description. In the description, relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are only for convenience of description.

The methods disclosed herein address the identification of the source of the systematic yield loss as derived from the e-test data, by providing a partitioning method to group wafers with similar systematic yield patterns.

In general, if one could reduce the noise in the system (response and/or predictor variables) by grouping or clustering wafers with similar root causes together, then such data mining methodologies may become more generally useful. Techniques described below address this issue of noise reduction of the response variable, specifically spatial variation in bin sort and failure bit map (FBM) yield.

Failure Signature Detection Analysis (FSDA) is a method for identifying yield loss mechanisms in semiconductor data, utilizing product test data, wherein a novel data organization and clustering method is applied to improve the identification of wafers with similar root cause induced failures.

FIG. 11 is a high level flow diagram of the method.

At step 1100, bin data (for example, failure bit map (FBM), die sort data, or multi-probe data), and the within-wafer spatial failure distribution of that bin data are mapped into an N-dimensional vector space defined by the bin failure (bin ID) and one of the prescribed spatial regions of the wafer. If the wafer is divided into K regions and there are J possible bin failure modes then the multi-dimensional space has K*J=N dimensions. Each wafer is mapped to one point in this space depending on its failure mode (fail bins and regions).

At step 1102, the data are prepared. Noise in the cluster identification is improved using a filtering method. For example, a method employing principal component analysis may be used.

At step 1104, a clustering algorithm can be applied in this N-dimensional space to identify groups or clusters of wafers with similar failing mechanisms or root causes.

At step 1106, a variety of analytical methods and tools may be used to obtain information about the cause of the problems. These tools present the data in a fashion that makes it easier to identify the problem cause(s).

At step 1108, the wafers thus identified to belong to certain groups can be further analyzed with so called drilldown techniques to identify the root cause of the failure. In this way, one can significantly improve upon the signal to noise resulting in a higher success rate of identifying the fundamental root cause of failure(s). The drill down techniques may include parametric to yield correlation analysis, defect to yield correlation (kill ratio) analysis, equipment commonality analysis, or the like.

FSDA uses a novel algorithm to group or cluster the wafers by their fail bin patterns; the type of bin failure and the spatial distribution of that failure.

Clustering of defect modes for FSDA detects/identifies clusters of failure bins and their associated spatial patterns. The failure bins can be from Fail Bit Map (FBM) data or die sort data and the spatial patterns can be constructed as per user configuration: typically a 9 zone+reticle field pattern are used but the zone definitions are not limited to these two choices and overlapping zones are permissible.

Figure 5:
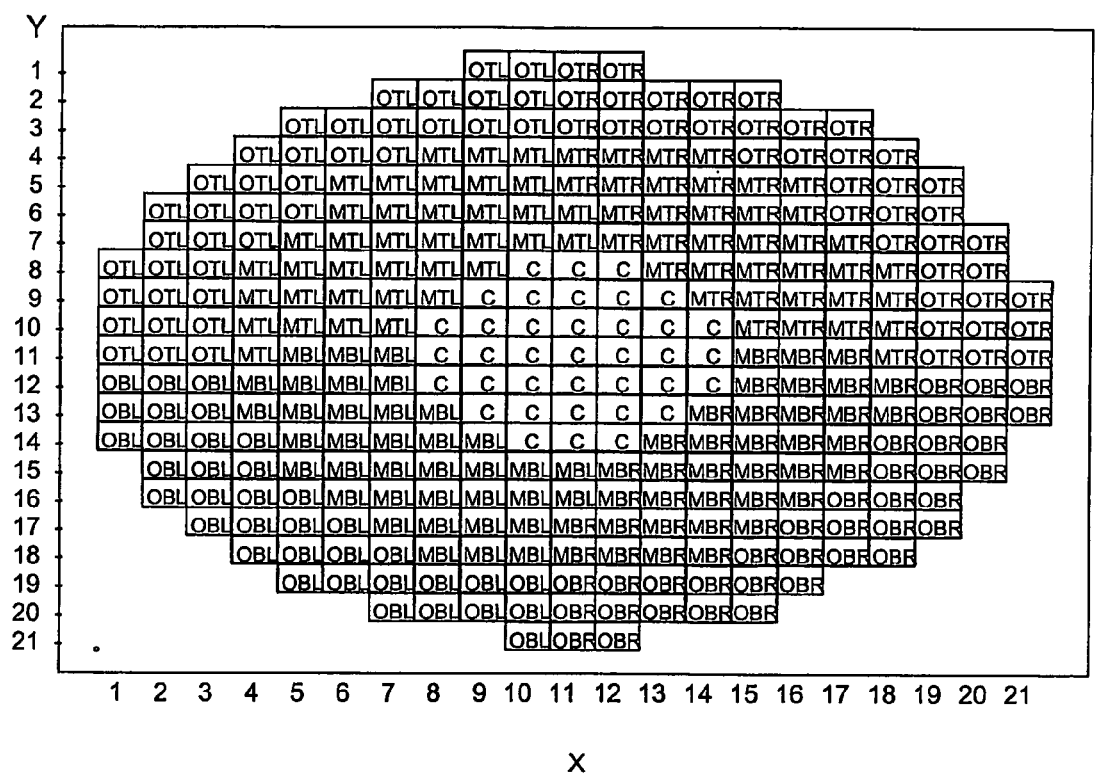
FIG. 5. Example Wafer Zone Definition: This figure depicts a 9 zone wafer definition. This is one of many possible sets.

FIG. 5 shows an example of a 9-zone pattern, in which each die on the wafer is assigned to one of the following nine zones: center (C), middle top left (MTL), middle top right (MTR), middle bottom left (MBL), middle bottom right (MBR), outer top left (OTL), outer top right (OTR), outer bottom left (OBL), outer bottom right (OBR)

Another useful choice is a 5-zone concentric ring pattern (not shown).

Figure 6:
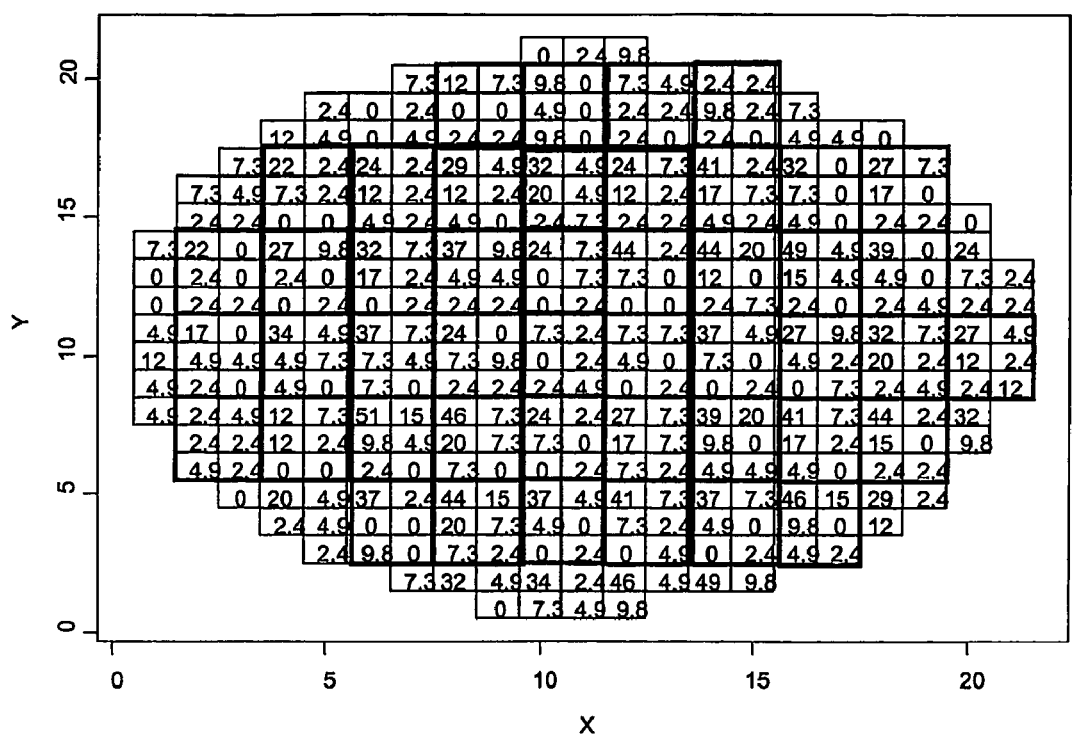
FIG. 6. Example of wafer sample with yield data suitable for analysis using a 6-zone reticle definition.

FIG. 6 is a diagram showing an example of a yield metric for a sample in which definition of 6 reticle zones would be advantageous. In FIG. 6, the average value of an exemplary yield metric is shown for each die position (averaged across a sample of 41 wafers). The heavy lines show groups of 6 die that are exposed simultaneously during a single exposure by the stepper. That is, each group of 6 die with a box surrounded by heavy lines indicates a reticle field. An inspection of the yield metric values shows that that the values for the top left die in each reticle field is significantly greater than the values in the other 5 die in each reticle field. This is an indicator that there is probably a photo related problem. For a reticle field with 6 die, an appropriate number of dimensions would by 6*J (J=number of failure metrics). Each wafer is represented by a single point. For each metric, the values of that metric across the wafer are combined into 6 averages, one for each of the die positions in the reticle field. The six die reticle field illustrated in FIG. 6 is only shown as an example; the method may be used with reticle fields having any number of rows and any number of columns.

Individual clusters of wafers and/or lots are identified by their failure mode (bin and pattern) and are compared against the "background" cluster group, which is the largest constituent cluster or a user-selected cluster. This approach uses a more generalized clustering approach based on the failure bin mode and the spatial distribution of that failure mode. An N-dimensional vector, where N is equal to the number of failure bin modes multiplied by the number of zones selected, is constructed and can represent all possible states of the wafer population. For a given wafer and zone, m-bins may fail and the number of failures would constitute the distance along that wafer/zone/bin(s) axes. In this way, an N-dimensional Euclidean "distance" matrix can be constructed for the entire population of wafers being analyzed such that each wafer is represented as a single point in this N-dimensional space. The differences in local distance between groups of wafers versus their distance from other groups can have a statistical threshold applied to it, so that a significance test can be used to determine if a given wafer is part of a cluster and whether a given cluster is discernible from other clusters. Given that many clusters can be generated, many of which are insignificant or spurious, some filtering using Principal Component Analysis is applied to identify the "natural" major cluster groups on which additional drilldown analysis can be performed. Also, engineering discretion may be applied such that grouping of clusters into larger groups is done subjectively if the automated algorithm appears to have excessive differentiation or if the user feels that the subsequent analysis is more appropriately done in larger groupings.

This approach uses a more generalized clustering approach based on the failure bin mode and the spatial distribution of that failure mode. Some major strengths of the FSDA approach are:

a. Can truly handle multiple yield metrics: multiple metrics, such as multiple FBM fail bins or multiple diesort bins beyond simply pass and fail bin (e.g. pass bin and/or overall fail bin), can be used.

b. Permits clustering based on different types of wafer patterns simultaneously: Some embodiments use spatial zones and reticle positions simultaneously in partitioning the wafers into meaningful spatial and reticle pattern clusters c. Recursive partitioning algorithm: this allows best partition of data in all yield regions. In other words, the best partitions of the wafers are more locally determined, i.e. by wafers around the relevant yield region. Otherwise, wafers with yield around 10% could be partitioned the same way as wafers around 50% or 90%.

d. Meaningful cluster identification criteria: tunable criteria to decide when a group of wafers have a similar enough pattern and are not to be sub-divided into more clusters.

e. Nominal re-grouping of clusters: automatically regroup clusters that are only marginally statistically different.

Figure 1:
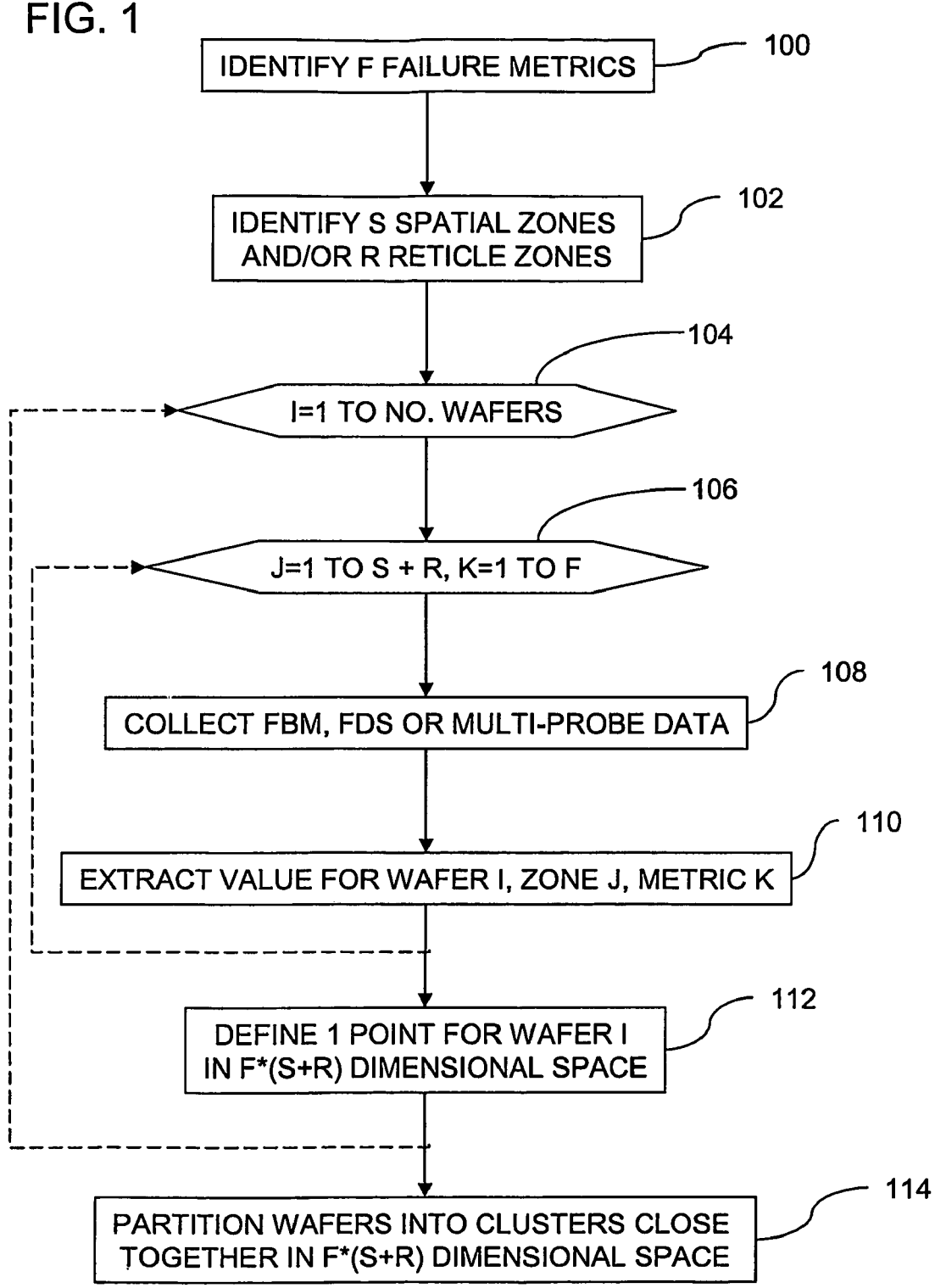
FIG. 1 is a flow chart diagram of an exemplary method for partitioning wafer failure data.

FIG. 1 is a flow chart diagram of a partitioning method according to a preferred embodiment of the FSDA, wherein clustering is performed on FBM and/or Die Sort data extracted from an IC product tester to identify groups of wafers with similar failure bins and failure patterns for those bins as follows:

At step 100, a set of F failure metrics appropriate for the wafer population is identified. For example, in the case of wafers containing memory chips, the metrics may include power-short, single bit cell failure, and the like.

At step 102, a set of S spatial zones and/or R reticle zones are identified. In preferred embodiments, both spatial and reticle zones are identified.

An N dimensional space is established that defines the yield metrics, where N=F*(S+R). Each wafer is represented by a respective point in this space. Each point is a vector having individual coordinates corresponding to values of the F failure metrics in each of the (S+R) zones of the corresponding wafer.

1.1.1 For example if there are 8 yield metrics and 9 zones, form 8*9=72 zone yields or dimensions, corresponding to a respective dimension for each combination of zone and metric.

1.1.2 Assume that there are 6 reticle patterns (six die exposed each time the stepper advances), 8*6=48 reticle yields are independently formed. These reticle yields entail adding another set of zones, in this case reticle field zones, that overlap with the other (spatial) zones but may present information in a more meaningful fashion in the case where, for example, there is defect in the reticle used to process the wafers. If one grouping (spatial or reticle representation) is stronger than another then that is what the algorithm will select as significant.

If there are some other interesting patterns to group the dies in a wafer, one can use the same idea to create these sets of within-wafer group yields. Selection of these patterns is subjective. For example, assume that the wafer fail patterns seem to have nearly circular fail patterns/ then one may choose a zonal definition that is composed of concentric rings extending from the center of the wafer instead of the 9 zone pattern that was depicted in the original zonal definition (FIG. 1).

1.1.4 Note that there is no requirement for these die partitions to be independent. In some embodiments, one partition may actually contain another partition. Then the subsequent tests would simply ignore one of these die partitions.

For example, if all instances of a failure mode are observed in a single spatial zone, but not in the other spatial zones, then the analysis will indicate that there are no periodic defects of the type shown in FIG. 6, and application of the algorithm to the reticle zone data will show that that failure mode is not confined to any one reticle zone. Conversely, if all instances of a failure mode are observed in a single reticle zone (a periodic pattern in a spatial representation), then that failure mode will not be confined to any of the spatial zones.

Having established the F*(S+R) dimensional space, at step 104, a loop including steps 106-112 is executed for each wafer.

At step 106, a loop including steps 108-110 is executed for each dimension of the F*(S+R) dimensional space.

At step 108, test data are collected. For example, FBM data, FDS data from an IC product tester, or multi-probe data may be collected.

At step 110, from the raw data a value is extracted for each dimension of the point (vector) representing that wafer.

At step 112, a respective point in the F*(S+R) dimensional space is defined for each wafer.

At step 114, the points representing the wafers are partitioned into clusters, such that the points in any given cluster are relatively close together in the F*(S+R) dimensional space, based on a Euclidean distance.

Figure 2:
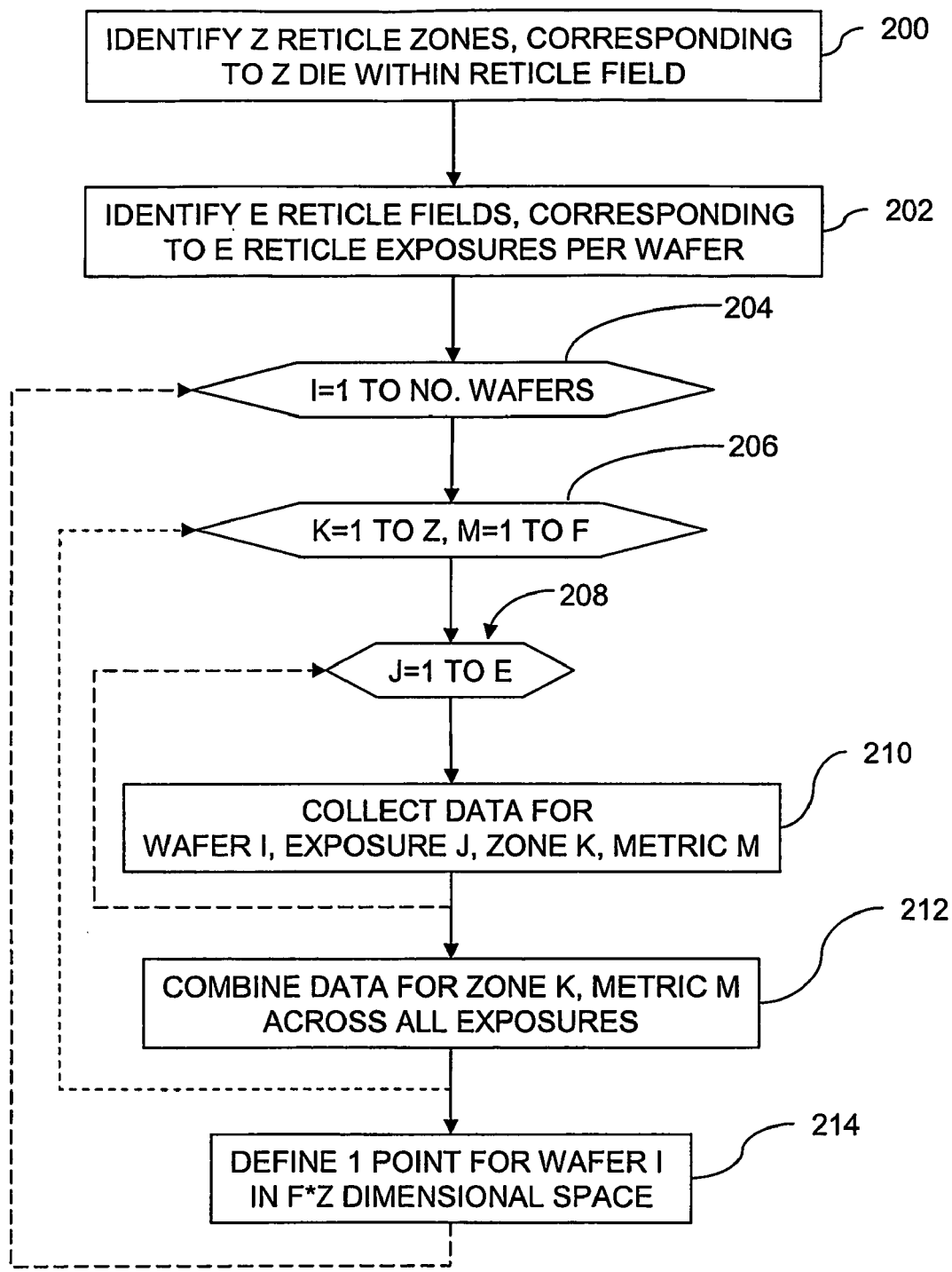
FIG. 2 is a flow chart diagram of an exemplary method wherein the data are assigned to reticle zones.

FIG. 2 is a flow chart of a more specific example, where only reticle zones are used.

At step 200, Z reticle zones are identified, corresponding to Z die within the reticle field.

At step 202, E reticle fields are identified, corresponding to E exposures by a stepper, where Z die are formed for each exposure.

At step 204, a loop from step 206-214 is performed for each wafer.

At step 206, a loop from step 208-212 is performed for each dimension (zone and failure metric combination).

At step 208, a loop is performed for each of the E reticle fields on a wafer.

At step 210, data are collected for the given wafer, exposure, zone and metric.

At step 212, for each dimension (zone-metric combination), the values across all exposures are combined, so that one value per dimension is used to characterize the given wafer.

At step 214, a respective point in the F*Z dimensional space is defined for each respective wafer.

Figure 3:
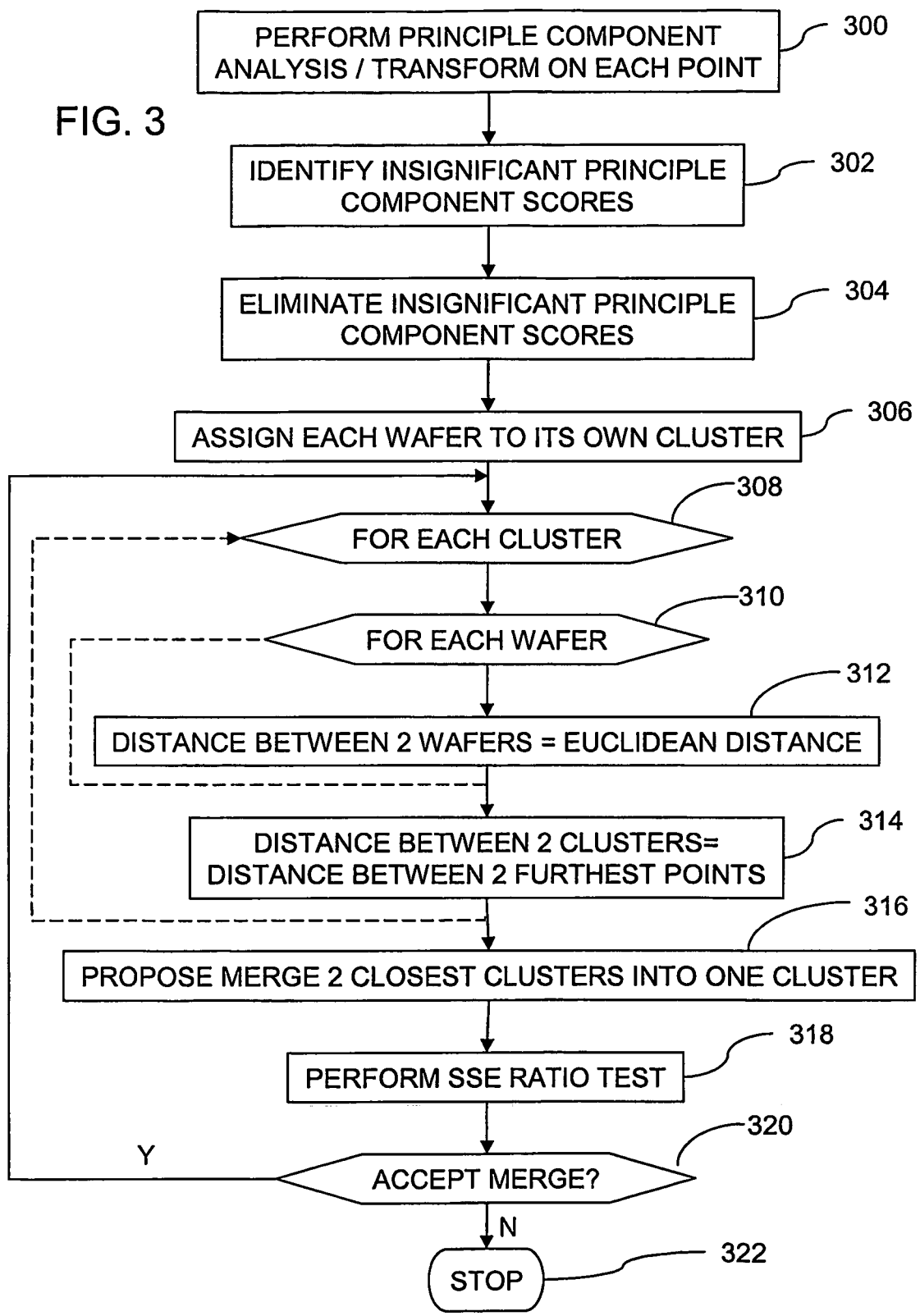
FIG. 3 is a flow chart diagram of an exemplary agglomerative hierarchical clustering method used for the clustering step of FIG. 1.

FIG. 3 is a flow chart showing an example of a noise reduction and wafer partitioning method using agglomerative hierarchical clustering. It will be understood that this is only one example of a clustering technique that may be applied to the N-dimensional data.

At step 300, a principal components analysis (PCA) is performed on both yield sets of zone yields and reticle yields, and the vector representing each wafer is transformed into the principal coordinates. PCA allows identification of significant principal component scores, and filtering out of insignificant ones, thus simplifying further analysis.

At step 302, the PCA scores that are deemed noise scores are identified. For example, according to one noise criterion, scores are considered noise if they do not vary significantly from normality.

At step 304, insignificant principal component scores are eliminated for both yield sets (spatial and reticle), keeping only the significantly non-noise scores.

Although steps 300-304 are described in the context of one exemplary clustering technique (agglomerative hierarchical clustering), PCA may be used as the preliminary step when any other clustering technique (e.g., divisive clustering, non-hierarchical clustering, or others) is used.

Steps 306-322 provide a first example of a method to partition the wafers. Agglomerative hierarchical clustering is a clustering algorithm that starts with each wafer as its own cluster and then recursively groups the wafers together that are closest using some defined distance metric.

At step 306, each wafer is initially assigned to a separate cluster of its own.

At step 308, a loop including steps 310-314 is performed for each cluster.

At step 310, a loop including step 312 is performed for each wafer (point).

At step 312, the distance between 2 wafers is the Euclidean distance in the significant non-noise scores defined by the PCA. That is for a pair of wafers X and Y described by N-dimensional vectors in an N-dimensional space, $$d = \left[ \sum_{i=1}^{N} (X_i - Y_i)^2 \right]^{\frac{1}{2}}$$

At step 314, the distance between 2 clusters (groups of wafers) is defined to be the maximum of all distances between any two of the wafers in the two clusters. This is the farthest neighborhood or, equivalently, the complete linkage distance. (The concept of complete linkage distance is explained in Duda, Hart, and Stork, Pattern Classification, John Wiley & Sons, Inc., New York, N.Y., 2001, pp. 550-559, which is incorporated by reference herein.)

Although the exemplary method uses the complete linkage distance, other cluster distance definitions may be used for the purpose of partitioning. In some embodiments, the distance between clusters is defined as the distance between the closest pair of points containing one point from each cluster. In some embodiments, the distance between two clusters is defined as the average distance between pairs of points containing one point from each cluster, with every possible combination reflected in the average. In still other embodiments, the distance between two clusters is defined as the distance between the centroid of each cluster. One of ordinary skill understands that each inter-cluster distance computation has a different sensitivity to outlying data points.

At step 316, the two wafer-clusters that are closest together (based on whatever cluster-distance definition is selected) are grouped into one cluster. In the example, agglomerative hierarchical clustering with a complete linkage distance metric is used to find the best partition of the wafers based on each of the two yield sets (spatial or reticle).

At step 318, given the best partition from each yield set, test if the partition should be performed. In the exemplary embodiment, the test may be based on a sum of the squared error (SSE) calculation.

The total SSE is defined as the sum (over all wafers) of the squares of the distances between the point corresponding to each wafer and the centroid of the cluster to which that point belongs. By this definition, the SSE is always zero if each point is assigned to a respective separate cluster, and the SSE is greatest when all points are assigned to a single cluster. One of ordinary skill will understand that an optimum partitioning can be defined such that agglomerative hierarchical clustering up to the optimum partition causes insignificant changes to the SSE, but additional merging of clusters beyond the optimal partition will have significant changes to the SSE. Put another way, if all points are initially assigned to a single super-cluster, divisive partitioning will cause substantial reductions in the SSE up to the optimal partition, after which further divisive partitioning will produce little improvement in SSE.

Other clustering methodology can be substituted in its place. CLARA (classification of large application) is one technique that has been investigated and proven to work well with large number (5K+) of wafers (Kaufman and Rousseeuw, Finding Groups in data: an Introduction to Cluster Analysis, 1990.)

Figure 7:
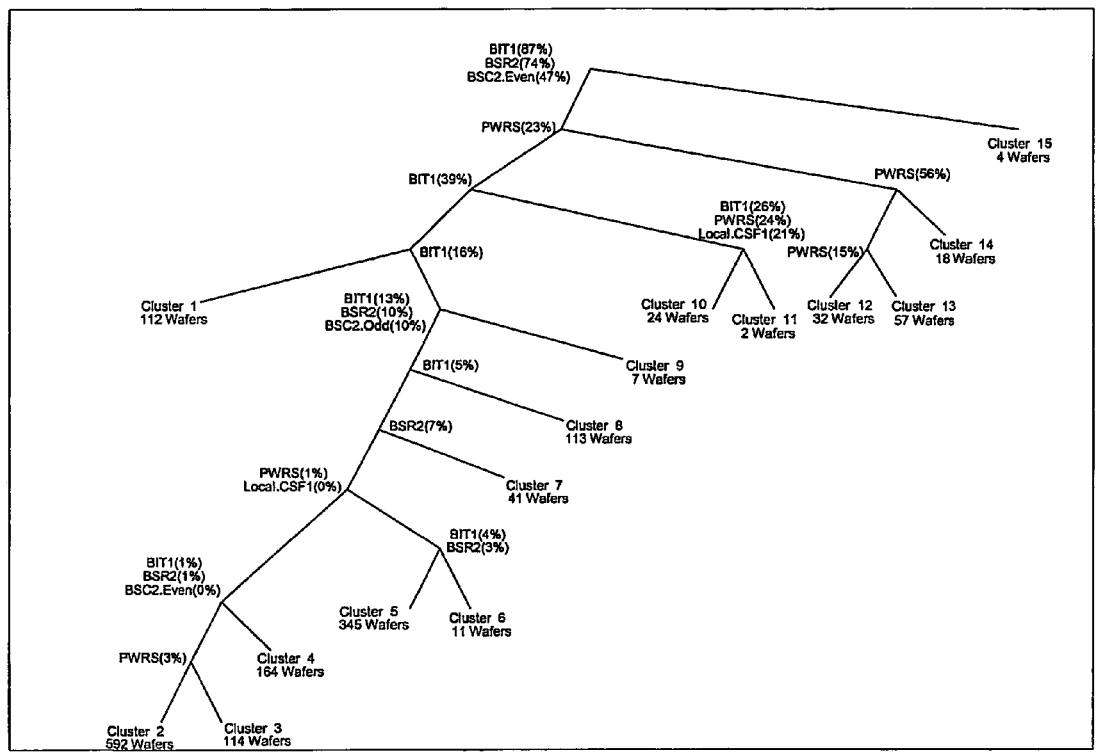
FIG. 7 is a Cluster Tree Visualization (dendrogram): This figure is an example of the number of different clusters as well as the relative relationship of wafer clusters to one another.

In other embodiments, divisive hierarchical partitioning is used. FIG. 7 shows an example of a dendrogram for visualizing a clustering technique that may be used. Note that the percentages are the difference in mean yield of the particular FBM bins between wafers in the left and right branches of the cluster tree node.

A calculation is performed to determine whether to accept the cluster, for example, based on the criterion (stop partitioning wafers) described by Duda, Hart, and Stork, at, pp. 557-559.). The partition test criterion checks if there is a significant reduction of sum of squared error (SSE) when one of the clusters is subdivided into two new clusters.

The SSE for all wafers in the cluster prior to divisive partitioning is defined as the sum of Euclidean distances of the wafers to the center of a single super-cluster containing all of the wafers in the non-noise scores space found by the PCA.

The SSE for the partitioned wafers is the sum of the two SSEs for the two partitioned clusters of wafers.

Because the individual wafers will always be closer to the centroids of their respective clusters after an additional divisive partitioning, the SSE is always reduced by an additional divisive partition.

At step 320, based on whether the reduction in SSE is "significant," a decision can be made whether to accept the partition (and continue partitioning) or to reject the partition and discontinue further partitioning. If the reduction in SSE is significant, the partition is accepted, and step 308 is again executed. If the reduction in SSE is insignificant, then the partitioning stops.

Figure 4:
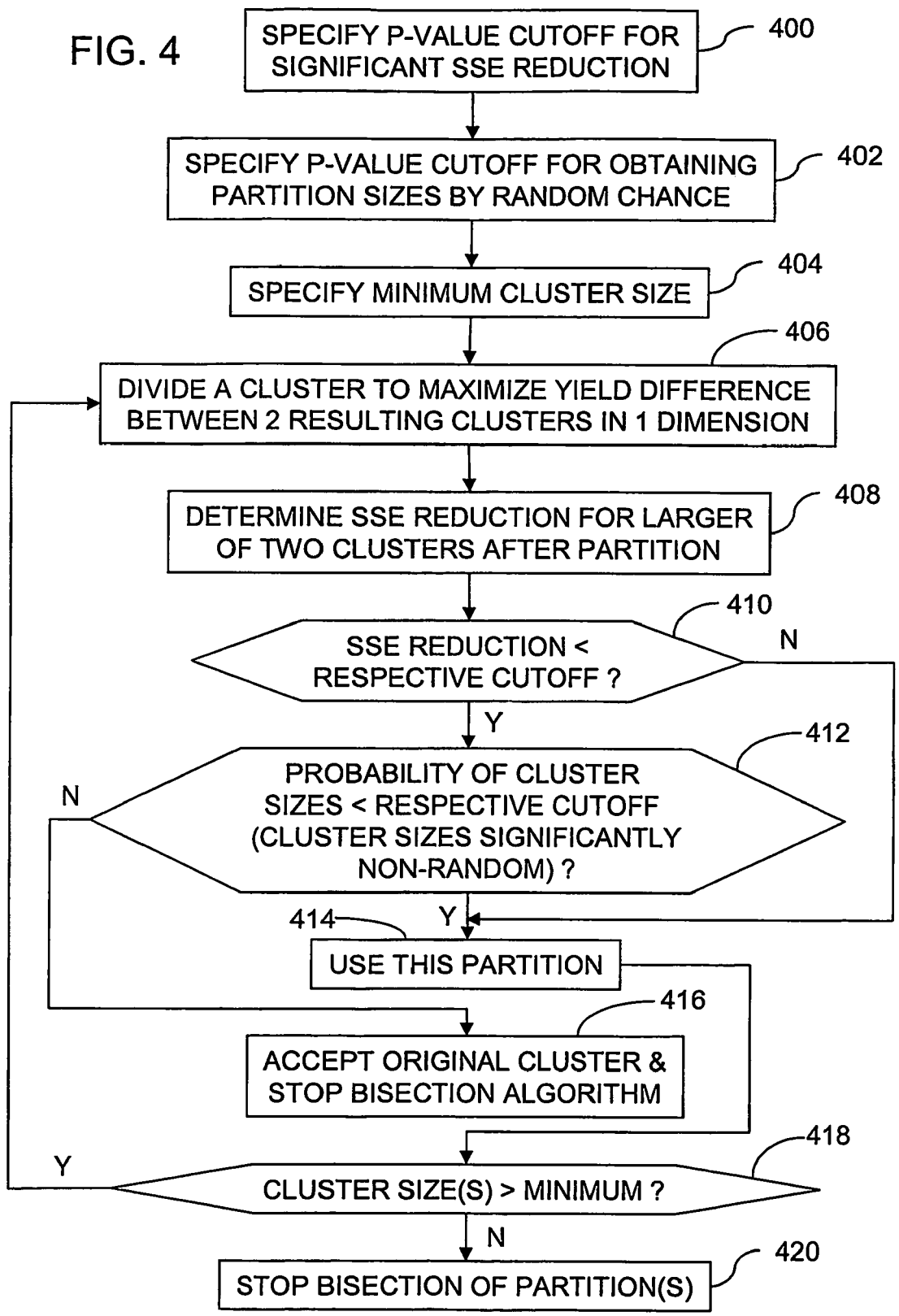
FIG. 4 is a flow chart diagram of an exemplary recursive bisection method for determining whether to divide a cluster into two smaller clusters.

FIG. 4 is a more detailed flow chart diagram of an exemplary partition evaluation process. The SSE reduction test is a test of ratio of the partitioned SSE to overall SSE. This ratio has a distribution that is approximately normal (Gaussian) when there is no significant partition of the wafers. Eventually a point is reached where dividing a cluster may not have a significant reduction in SSE, for example, where the cluster does not have any outliers.

At steps 400 and 402, two p-value cutoffs are specified for the significance levels to be used to accept the wafers as a cluster or partition them to two groups.

At step 400, the first p-value cutoff is specified to determine when the reduction of SSE is significant.

At step 402, the second p-value cutoff is specified for the probability of obtaining the actual partitioned component sizes by random chance.

At step 404, a minimum cluster size is specified.

At step 406, a cluster is divided (partitioned) to maximize the yield difference (in one principle component dimension) between the two resulting clusters. An example of this step is shown in FIG. 7. For example, at the top (root) of the dendrogram in FIG. 7, the complete sample of wafers is divided into two groups: a first group including cluster 15 (4 wafers) and the remaining group, which has several hundred wafers (which eventually are assigned to clusters 1-14 ). These two groups differ in the BIT1 yield metric by 87%, in the BSR2 yield metric by 74% and in the BSC2 Even yield metric by 47%. Then, the remaining group is again divided into a first group (eventually assigned to clusters 12-14) and a remaining group (eventually assigned to clusters 1-11). These two groups differ in the yield metric PWRS by 23%. One of ordinary skill can readily recognize how at each node of the dendrogram, a cluster is divided to maximize the yield difference between the two clusters formed by the partition. Thus, a node that is closer to the root of the dendrogram by definition has a greater yield difference between branches than a node that is closer to the leaves of the dendrogram. In general, the more nodes there are separating a given node from the root, the smaller the yield difference at the given node will be.

A variety of techniques may be used to identify a proposed partition into clusters. FIGS. 9-10 show Pareto plots that are useful for human analysis of the data to make this assessment. For example, FIG. 9 shows that in cluster 14 (of the dendrogram in FIG. 7), all of the zones show a yield problem with the PWRS metric, and none of the zones have a significant yield problem with the other seven metrics. FIG. 10 is a pareto plot of cluster 9 from FIG. 7, in which all of the metrics for the outer bottom left zone show the greatest yield problems, and all metrics show significant yield problems in the middle bottom left zone.

At step 408, the SSE reduction is determined by one minus the ratio of the SSE of the larger of two clusters after the partition to the SSE of the original cluster before the partition.

At step 410, the SSE reduction is compared to the cutoff.

If the SSE reduction is less than the cutoff, then step 412 is executed. If the SSE reduction is greater than or equal to the cutoff, then step 414 is performed.

At step 414, if the more significant wafer partition of the two yield sets reduces the SSE significantly, i.e. with p-value less than the pre-specified p-value cutoff, use this partition to divide wafers into 2 clusters. When step 414 is executed, step 416 is skipped, and step 418 is executed next.

At step 412, where the SSE reduction is less than the cutoff, the second test for accepting the partition is performed. At step 412, if both partition tests for SSE reduction are not significant, check whether one of the two partitions has significantly different numbers of wafers in its two partitioned components. If the partition component sizes are significantly non-random, tested against the p-value cutoff of step 402, then step 414 is executed to divide the wafers into 2 groups by this partition.

If both tests (steps 410 and 412) return non-significant partitioning of the wafers for both yield sets, the step 416 is performed.

At step 416, the wafers are accepted as a cluster and the bisection algorithm is stopped with the current set of wafers. This corresponds to accepting a cluster as a leaf of the dendrogram as shown in FIG. 7.

At step 418, the size of the new clusters is compared to the minimum cluster size. If either of the clusters is greater than the minimum, then the recursive bisection continues at step 406 for that cluster. If either of the clusters is less than the minimum, step 420 is executed for that cluster.

At step 420, for partitions that contain small number of wafers, i.e. less than some pre-specified minimum wafer number, accept wafers in these partitions as clusters and stop bisection algorithm on these groups of wafers.

Thus, the loop from steps 406-418 is recursively applied to each of the larger wafer partitions, using wafers in each partition, and in child partitions that still satisfy the criteria for further partitioning.

FIG. 12A is a flow chart showing the remaining steps for determining the cause(s) of the failures.

At step 1200, the cluster partitioning is performed on the filtered yield metric data, as described above, or using another clustering technique.

Figure 8:
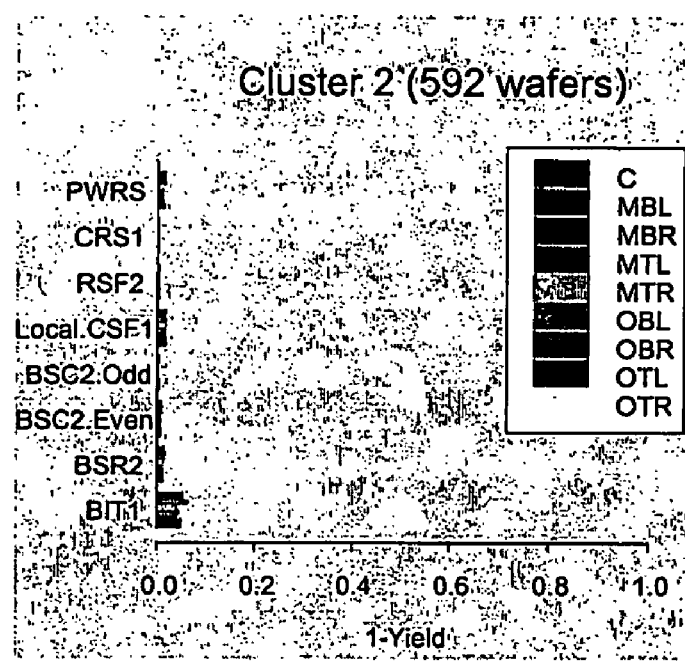
FIG. 8 is a Pareto Plot of a baseline Cluster. In this example, the cluster has points representing 592 wafers with 8 different yield metrics.

At step 1202, select a baseline cluster that represents best-case typical operation of the manufacturing facility (fab). Heuristic algorithms are used to select the baseline cluster taking into account both yield and cluster size. For example, the baseline cluster may be identified manually using a set of pareto plots. FIG. 8 shows a cluster that could serve as the baseline cluster of the sample shown in FIG. 7. None of the 8 yield metrics shows a significant problem for this cluster.

At step 1204, a loop including steps 1206-1216 is performed for each cluster.

At step 1206, perform a drill down analysis to provide information about root cause.

At step 1208, perform qualitative micro-event on each cluster and compare to the baseline. The result of this is a list of one-or-more process modules that can help drive subsequent drill down.

At step 1210, for process steps in the target modules, perform equipment commonality analysis on lots in the baseline and the target cluster to determine if any equipment contains more lots from this cluster than can be accounted for by random chance. If so, mark these steps for detailed examination of the equipment parameters (inline).

At step 1212, perform an analysis comparing the defectivity of baseline and each cluster.

Create plots when defectivity is significantly higher in target cluster.

At step 1214, for scribeline measurements associated with the target modules, perform a scribeline analysis to determine if the scribeline parameters are significantly different between the target cluster and the baseline. If so, create plots to indicate the difference.

4) Build the equipment parameter (inline) data sets needed for detailed examination of equipment parameters. These are identified during step 1210.

For each cluster, complete the drill down. At step 1216, Check each equipment parameter in the targeted process steps to determine if there is a significant difference between targeted cluster and baseline.

When the analysis is completed, one can create an overall summary report and create a final drill down PowerPoint report for each cluster.

FIG. 12A shows a preferred drilldown algorithm for FBM drilldown—when all data are available. FBM is used for memory, where the failed bits on each memory chip can be identified as to their general location from a memory test. FBM data can be used directly for drill down. If one is looking at die sort yield, then equipment commonality, tool QC/equipment log, scribeline, and defectivity analyses are preferably used. For die sort data, the spatial algorithms described above are used for drill down to find the tool responsible for the failures.

Figure 12B:
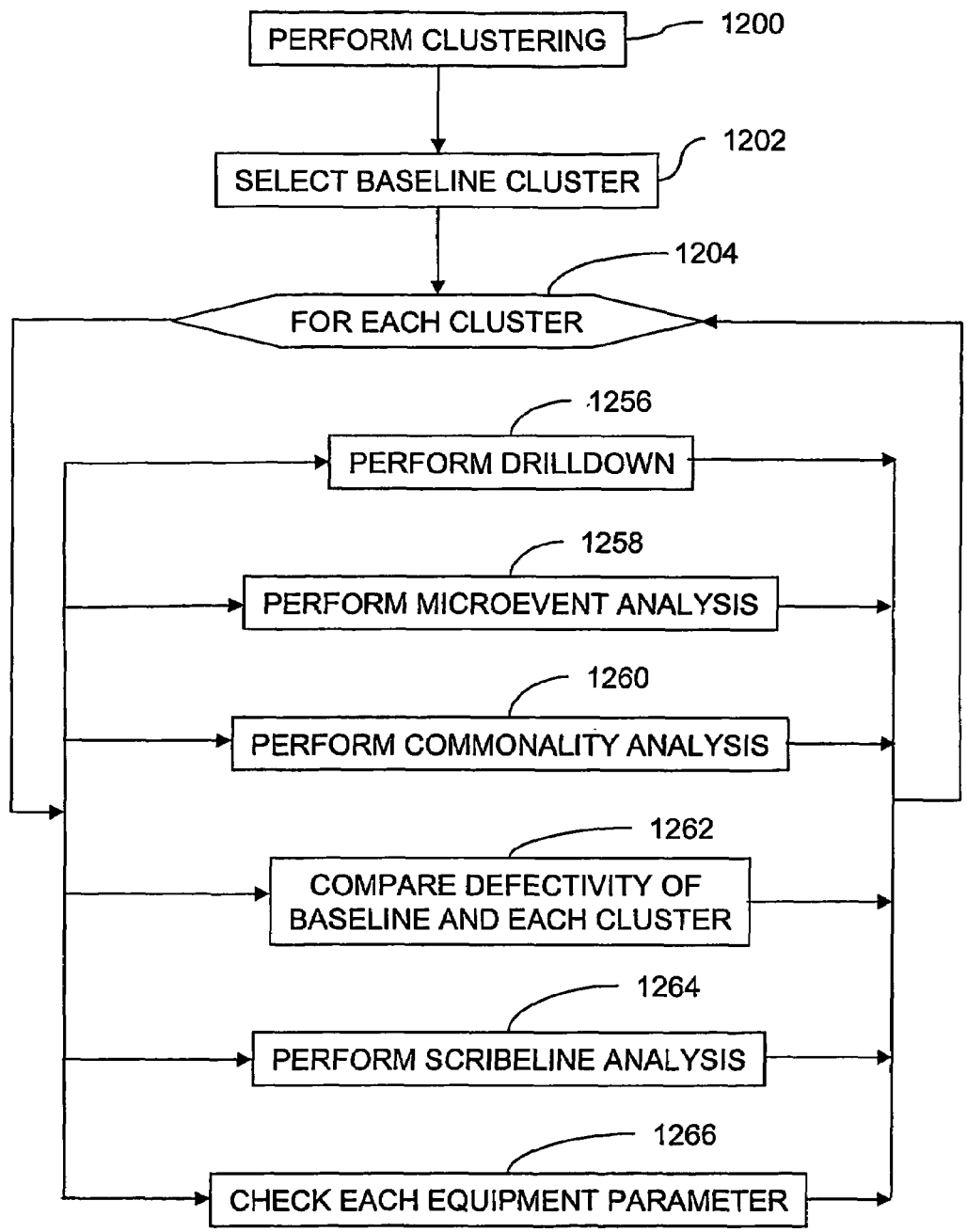

FIG. 12B shows a variation of the method of FIG. 12A. In FIG. 12B, steps 1256-1266 are the same as the respective steps 1206-1216, but are not performed in the sequence of FIG. 12A. FIG. 12B shows that the steps 1256-1266 may be performed in parallel, instead of sequentially. A signal found in one of these drilldown methods may drive subsequent analysis using one of the other methods but that the order of drilldown is not necessarily fixed.

Further, one of ordinary skill will understand that steps 1206-1216 may be performed in other sequences, or in combinations of some steps in parallel and other steps in sequence.

FIG. 14 is a flow chart diagram with a detailed description of step 1210 (Equipment Commonality Analysis) of FIG. 12A.

As noted above with reference to FIG. 12A, at step 1202, all wafers are classified into clusters of different yield patterns, and one cluster is established as the baseline cluster (good wafers cluster). This allows comparison of all other clusters with the baseline cluster. Although the failure data have been clustered, the equipment data is at the lot level. For each processing step, data indicate the lots that were processed through the equipment corresponding to that step. As such, the wafer cluster results are now organized at lot level for equipment commonality analysis.

At step 1400, a loop of steps 1402-1404 is executed for each cluster.

At step 1402, a loop of step 1404 is executed for each lot.

At step 1404, for each cluster, only the wafers that are in that cluster (bad wafers) and in the baseline cluster (good wafers) are used. For each lot, a statistic is calculated that measures the goodness of that lot (the "lot goodness ratio") by taking the proportion of good wafers, or the number of wafers in baseline for that lot divided by the sum of all wafers in baseline and cluster in that lot.

The step 1406-1418 use this lot-level proportion of good wafer statistic to identify processing steps with equipment that contain significant number of bad lots (lots containing high proportion of bad wafers). This is referred to as the Equipment Commonality Analysis.

At step 1406, an Equipment Commonality Analysis Method is selected to identify bad equipment. Two examples of preferred analysis techniques are Monte Carlo (Bootstrapping) and Analysis of Variance between Groups (ANOVA).

If the bootstrapping (Monte Carlo) method is used, then at step 1408, internal data are essentially randomly selected with replacement.

At step 1410, the probability of the given outcome is calculated. Given the yield and equipment assignment of the lots, the bootstrapping (Monte Carlo) method may be used to compute the probability of the lots being distributed among the equipment in the realized outcome without any assumption about the yield distribution. This can be used on discrete data.

The Monte Carlo simulation calculates multiple scenarios of a model by repeatedly sampling values from the probability distributions for the uncertain variables and using each values for a respective trial. Monte Carlo simulations can include as many trials as desired. This method is used to obtain greater accuracy at the expense of time. When repeated for many scenarios (e.g., 10,000 or more), the average solution gives an approximate answer to the problem. Accuracy of this answer can be improved by simulating more scenarios. The accuracy of a Monte Carlo simulation is proportional to the square root of the number of scenarios used.

i. Given N lots distributed among K equipment in a given step with equipment 1 to K containing $N_1$ to $N_K$ number of lots, compute the realized equipment weighted sum of square error (WSS):

$$WSS = \frac{1}{N}\sum_{i=1}^{K} N_i(Y_i - \overline{Y})^2$$

where $Y_i$ is the yield of equipment i (average yield of lots through equipment i) and Y is the overall yield.

ii. Next, randomize the lot-equipment relationship M times and each time compute the WSS of the randomized data to obtain the distribution of this WSS statistic.

iii. Lastly, say a subset MG of these M computed WSS statistics is larger than the realized WSS in step i, so the p-value is $M_G/M$.

In other words, the larger WSS values correspond to lot-equipment relationships where there is greater variation among the yields of the various lots. The smaller WSS values correspond to lot-equipment relationships where there is little, or only noise, variation among the yields of the various lots. Thus, the $M_G/M$ ratio indicates the probability that the variation among the yields is as large as the actual observed variation.

The ANOVA method of steps 1412-1418 is a standard statistical ANOVA (e.g., F test). Given the yield and equipment assignment of the lots, the ANOVA method can be used to identify whether the yield variation among the equipment is significantly larger than the noise (average yield variation within the equipment).

At step 1412, the yield variation among lots (equipments) is calculated. The collection of the "lot goodness ratios" are treated as data and the variation of those ratios is calculated.

At step 1414, the yield variation within lots (equipments) is determined, based on an overall variation among all of the wafers, adjusted for the cluster size.

At step 1416, the ratio of the variation among lots to the variation within lots is calculated. The number of degrees of freedom ("d.f.") for the numerator (variation among lots) is one less than the number of lots. The number of degrees of freedom for the denominator (so called "error" or variation within lots or expected variation) is the total number of wafers minus the total number of lots. The F ratio can be computed from the ratio of the mean sum of squared deviations of each lot goodness ratio from the overall mean yield [weighted by the size of the lot] ("Mean Square" for "between") and the mean sum of the squared deviations of each item from that item's lot mean ("Mean Square" for "error"). In the previous sentence "mean" indicates dividing the total "Sum of Squares" by the number of degrees of freedom.

At step 1418, the significance of the ratio can be determined, for example, from a table of the F-distribution, using the relevant degrees of freedom.

The ANOVA method of steps 1412-1418 is based on the assumption that the noise is normally distributed. So precision of the computed probability of event (p-value) suffers when the data do not meet this assumption. However, the ANOVA method is very fast.

Both Monte Carlo and ANOVA methods return comparable p-values when the normality assumption is valid. The bootstrapping (Monte Carlo) method is preferred when the normality assumption is invalid (for example highly discretized yield metric) or when a high degree of accuracy is desired. ANOVA is used when time is of the essence and the accuracy is deemed sufficient.

Thus, a method has been described for organizing semiconductor wafer data and its spatial variability such that N-dimensional vectors can be constructed that represent each wafer as a single point in this aforementioned N-dimensional space. A wafer zone map is prescribed with or without overlapping regions. A data-zone vector is constructed for each wafer. The semiconductor data may be bin data such as die sort, multi-probe, and fail bit map data. A portion of the resulting constructed data points in the N-dimensional space can be defined as "clustered" according to some set of rules. In some embodiments, a filtering analysis is performed on the data-zone vectors to determine the dominant clusters in the data, and a distance matrix is constructed and a distance threshold determined, The filtering method used may include principle component analysis to determine the dominant clusters in the N-dimensional space. A drill down method, may include, for example, tool commonality, microevents from FBM, or the like.

FIG. 13 is a flow chart of a variation of the clustering method that may be used with a very large sample of wafers, such that insufficient computer memory resources are available to automatically perform all of the clustering computations for agglomerative hierarchical clustering beginning with each wafer in a separate cluster.

At step 1300, the data are divided into two sets. The wafers in the first set are assigned to an initial set of clusters. The wafers in the second set are to be incorporated into the initial clusters.

At step 1302, the initial clusters are formed by randomly selecting wafers from the first set.

At step 1304, a loop containing steps 1306-1314 is performed for each wafer in the second set.

At step 1306, the wafer is assigned to the cluster having its centroid nearest the wafer to be assigned. Distance is measured using the Euclidean distance in N-dimensions, $d=|x_{jwafer}-x_{icluster}|$ where $x_{jwafer}$ is the position in N-space of the $j^{th}$ wafer of the $i^{th}$ cluster and $x_{icluster}$ is the mean position of the $i^{th}$ cluster where mean position is calculated using the mean of wafer positions in that cluster. Then the cluster acceptance criterion (e.g., SSE) is applied.

At step 1308, a decision is made whether to add the wafer to one of the existing clusters. If the wafer belongs in the cluster, step 1310 is executed. If the wafer does not belong in an existing cluster (i.e., if it is an outlier), step 1312 is executed to form a new cluster containing the wafer.

At step 1314, summary statistics are updated.

By using the method of claim 13, the techniques described above can be extended to samples of any size.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A method for analyzing a sample of wafers, comprising the steps of:
   (a) identifying F failure metrics that are applicable to at least one circuit pattern on each wafer within the sample of wafers, where F is an integer;
   (b) identifying Z spatial and/or reticle zones on each wafer, where Z is an integer;
   (c) providing values for each of the F failure metrics, for each of the Z zones on each wafer;
   (d) defining a point for each respective wafer in an N-dimensional space, where N=F*Z, and each point has coordinates corresponding to values of the F failure metrics in each of the Z zones of the corresponding wafer; and (e) clustering the sample of wafers into a plurality of clusters of wafers using a computer, so that the wafers within each cluster are close to each other in the N-dimensional space, thereby identifying the plurality of clusters of wafers from the sample of wafers so that within each individual cluster, the wafers have a similar distribution of defects.

2. The method of claim 1, wherein step (c) includes extracting the values from failure bit map data, multi-probe data or final die sort data collected from each wafer, using a die sort tester.

3. The method of claim 1, wherein:
step (b) includes identifying Z reticle zones, corresponding to Z zones within a reticle used to make each wafer,
each wafer has E reticle fields corresponding to E exposures of the wafer using the reticle, and
step (c) includes providing, for each wafer, Z values for each failure metric, each of the Z values representing a combined measure of the values of that failure metric for a given one of the reticle zones across all E reticle fields of that wafer.

4. The method of claim 3, wherein the D reticle zones correspond to D die within each reticle field.

5. The method of claim 1, wherein:
S spatial zones and R reticle zones are identified on each wafer, where R and S are integers,
steps (c), (d) and (e) are performed with Z=S, using spatial data from the S spatial zones, and
steps (c), (d) and (e) are performed with Z=R, using reticle data from the R reticle zones.

6. The method of claim 1, further comprising after step (d), filtering the data to eliminate noise.

7. The method of claim 1, further comprising after step (d),
performing a principle component analysis on the coordinates for each point to identify a set of principle component scores;
identifying insignificant principal component scores; and
eliminating the insignificant principal component scores before step (e).

8. The method of claim 7, wherein step (e) includes:
initially assigning each wafer to a respectively different cluster;
determining a respective distance between each pair of the clusters in a principle component space; and
recursively combining into a single cluster the pair of clusters that are separated by a smallest distance in the principle component space.

9. The method of claim 7, wherein step (e) includes agglomerative hierarchical clustering.

10. The method of claim 9, wherein a distance between a given two of the clusters is defined as the greatest distance, in the N-dimensional space, between any two wafers in the given two clusters, and the agglomerative hierarchical clustering includes combining wafers of the clusters until the smallest distance between any two of the clusters exceeds a predetermined threshold.

11. The method of claim 8, wherein the distance between a pair of clusters is defined as the greatest distance between any two points corresponding to any of the wafers in the pair of clusters.

12. The method of claim 1, wherein step (e) comprises:
(e1) initially assigning a subset of the wafers to one of the clusters;
(e2) determining a respective distance between the point corresponding to each of the subset of wafers and a centroid of the one cluster;
(e3) calculating a first sum of the squared errors from the distances of step (e2);
(e4) calculating a second sum of the squared errors that is obtained from each of two partitioned clusters to be formed by partitioning the one cluster, where the second sum of the squared errors is based on the respective distance between each point and a centroid of the respective partitioned cluster to which that point is to be assigned;
(e5) partitioning the one cluster into the two partitioned clusters, if the second sum of the squared errors is significantly less than the first sum of the squared errors.

13. The method of claim 12, wherein step (e5) comprises partitioning the one cluster into the two partitioned clusters, if one minus a ratio of the second sum of the squared errors divided by the first sum of the squared errors exceeds a threshold value.

14. The method of claim 1, further comprising performing a commonality analysis to identify one or more pieces of equipment responsible for a lot of wafers having a yield below a desired yield.

15. The method of claim 14, wherein the commonality analysis includes a Monte Carlo simulation.

16. The method of claim 14, wherein the commonality analysis includes analysis of variance between lots of wafers.

* * * * *